(12) United States Patent
Wu

(10) Patent No.: US 11,782,272 B2
(45) Date of Patent: Oct. 10, 2023

(54) VIRTUAL REALITY INTERACTION METHOD, DEVICE AND SYSTEM

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD., Shandong Province (CN)

(*) Notice: Subject to any disclaimer, the term of this patent is extended or adjusted under 35 U.S.C. 154(b) by 0 days.

(21) Appl. No.: 17/819,518

(22) Filed: Aug. 12, 2022

(65) Prior Publication Data
US 2022/0382051 A1    Dec. 1, 2022

Related U.S. Application Data

(63) Continuation of application No. PCT/CN2021/122659, filed on Oct. 8, 2021.

(30) Foreign Application Priority Data

Apr. 27, 2021   (CN) .......................... 202110461080.0

(51) Int. Cl.
*G02B 27/01* (2006.01)
*G06F 3/01* (2006.01)
*G06T 7/70* (2017.01)

(52) U.S. Cl.
CPC ............ *G02B 27/017* (2013.01); *G06F 3/011* (2013.01); *G06T 7/70* (2017.01); *G02B 2027/0138* (2013.01); *G06T 2207/30196* (2013.01)

(58) Field of Classification Search
CPC .......... G02B 27/017; G02B 2027/0138; G06F 3/011; G06T 2207/30196
See application file for complete search history.

(56) References Cited

U.S. PATENT DOCUMENTS

2013/0222215 A1* 8/2013 Kobayashi ........... G02B 27/017
                                                        345/8
2016/0093108 A1* 3/2016 Mao ..................... G02B 27/017
                                                        345/633
(Continued)

FOREIGN PATENT DOCUMENTS

CN          106648038 A      5/2017
CN          107667331 A      2/2018
(Continued)

OTHER PUBLICATIONS

First Office Action dated Jul. 29, 2022 in CN Appl. No. 202110461080.0, English translation (20 pages).
(Continued)

*Primary Examiner* — Matthew A Eason
*Assistant Examiner* — Chayce R Bibbee (57) ABSTRACT

The present disclosure relates to a virtual reality interaction method, a device and a system. The method includes: acquiring relative pose data of a target individual relative to a head-mounted device at a first time point, wherein the target individual is an individual in a reality space where the head-mounted device is located, the target individual and an individual wearing the head-mounted device are different individuals, and the pose data includes position data and posture data; obtaining virtual pose data of the target individual in a virtual scene of the head-mounted device at the first time point according to the relative pose data; and rendering and displaying a virtual individual corresponding to the target individual in the virtual scene according to the virtual pose data.

14 Claims, 3 Drawing Sheets

(56) References Cited

U.S. PATENT DOCUMENTS

| | | | |
|---|---|---|---|
| 2016/0350973 A1 | 12/2016 | Shapira et al. | |
| 2018/0005429 A1* | 1/2018 | Osman | A63F 13/56 |
| 2018/0247453 A1 | 8/2018 | Nakashima et al. | |
| 2022/0277476 A1* | 9/2022 | Sagong | G06T 7/74 |
| 2022/0374073 A1 | 11/2022 | Wu | |
| 2022/0382051 A1 | 12/2022 | Wu | |

FOREIGN PATENT DOCUMENTS

| | | |
|---|---|---|
| CN | 107820593 A | 3/2018 |
| CN | 109643161 A | 4/2019 |
| CN | 110991327 A | 4/2020 |
| CN | 112130660 A | 12/2020 |
| CN | 113262465 A | 8/2021 |
| WO | 2019143572 A1 | 7/2019 |
| WO | 2020240044 A1 | 12/2020 |

OTHER PUBLICATIONS

Search Report dated Jan. 26, 2022 in PCT/CN2021/122659, English translation (12 pages).

* cited by examiner

VIRTUAL REALITY INTERACTION METHOD, DEVICE AND SYSTEM

The present disclosure is a continuation of PCT Application No PCT/2021/122659 filed on Oct. 10, 2021, which claims the priority of a Chinese patent application filed with the NATIONAL INTELLECTUAL PROPERTY ADMINISTRATION, PRC on Apr. 27, 2021, application No. 202110461080.0 and entitled "VIRTUAL REALITY INTERACTION METHOD, DEVICE AND SYSTEM", the entire contents of which are incorporated herein by reference.

TECHNICAL FIELD

The embodiment of the disclosure relates to the technical field of virtual reality, in particular to a virtual reality interaction method, a device and a system.

BACKGROUND

Virtual reality head-mounted integrated machine is usually disposed so that everyone can wear a single virtual reality integrated machine for virtual reality interaction. This is largely due to the nature of virtual reality head-mounted integrated machines and their ability to deliver VR to only one person at a time. Therefore, when two or more users of the virtual reality head-mounted integrated machine are in the real world for a virtual reality experience at the same time, they may be immersed in different virtual reality environments, completely unaware of each other's experiences.

Although virtual reality is interesting, it has become very isolated due to its lack of social dimension. Therefore, users often sacrifice social interaction for immersive entertainment, and vice versa, thereby reducing the entertainment and experience of users.

SUMMARY

An object of the embodiment of the present disclosure is to provide a new technical solution of a virtual reality interaction method, a device and a system, so that a user can know the experience of other users in a virtual environment through a head-mounted integrated device, and improve the use experience of the user.

According to a first aspect of the present disclosure, a virtual reality interaction method is provide, the method includes: acquiring relative pose data of a target individual relative to a head-mounted device at a first time point, wherein the target individual is an individual in a reality space where the head-mounted device is located, the target individual and an individual wearing the head-mounted device are different individuals, and the pose data includes position data and posture data; obtaining virtual pose data of the target individual in a virtual scene of the head-mounted device at the first time point according to the relative pose data; and rendering and displaying a virtual individual corresponding to the target individual in the virtual scene according to the virtual pose data.

Alternatively, acquiring the relative pose data of the target individual relative to the head-mounted device at the first time point includes: acquiring target pose data of the target individual in a preset coordinate system at the first time point; acquiring reference pose data of the head-mounted device in the preset coordinate system at the first time point; and obtaining the relative pose data according to the target pose data and the reference pose data.

Alternatively, the target pose data includes target posture data and target position data, and acquiring the target posture data of the target individual in the preset coordinate system at the first time point includes:
acquiring image data, which is collected by a first camera of the head-mounted device at the first time point, of the target individual in the reality space; identifying first posture data of the target individual in a camera coordinate system according to the image data; and obtaining the target posture data of the target individual in the preset coordinate system at the first time point according to the first posture data and set coordinate system conversion data; wherein the coordinate system conversion data reflects a conversion relationship between the camera coordinate system and the preset coordinate system.

Alternatively, acquiring the target position data of the target individual in the preset coordinate system at the first time point includes: identifying first position data of the target individual in the camera coordinate system according to the image data; and obtaining the target position data of the target individual in the preset coordinate system at the first time point according to the first position data and the coordinate system conversion data; or, acquiring the target position data, which is second position data provided by the head-mounted device corresponding to the target individual, wherein the second position data is position data of the head-mounted device in the set coordinate system at the first time point.

Alternatively, identifying the first posture data of the target individual in the camera coordinate system according to the image data includes: identifying set human skeleton point feature in the image data; and obtaining the first posture data according to the human skeleton point feature.

Alternatively, prior to obtaining the virtual pose data of the target individual in the virtual scene of the head-mounted device, the method further includes: acquiring the pose data of the head-mounted device in the reality space by a second camera of the head-mounted device.

Alternatively, prior to acquiring the relative pose data of the target individual relative to the head-mounted device in the reality space where the head-mounted device is located, the method further includes: acquiring an interactive request output by the target individual, wherein the interactive request carries identity information of the target individual; verifying the interaction request based on the identity information; and rendering the virtual individual corresponding to the target individual in the virtual scene when the verifying is passed.

According to a second aspect of the present disclosure, a virtual reality interaction device is also provided, which includes:
a data acquisition module configured to acquire relative pose data of a target individual relative to a head-mounted device in a reality space where the head-mounted device is located, wherein the target individual and an individual wearing the head-mounted device are different individuals; a virtual pose acquisition module configured to acquire virtual pose data of the target individual in a virtual scene of the head-mounted device according to the relative pose data and pose data of the head-mounted device in a reality space; and a rendering module configured to render and display a virtual individual corresponding to the target individual in the virtual scene according to the virtual pose data.

Alternatively, wherein the apparatus includes: a memory and processor, wherein the memory is configured to store a computer program; and the processor is configured to execute the computer program to implement the method according to the first aspect of the present disclosure.

According to a third aspect of the present disclosure, a virtual reality interaction system is also provided, which includes a server and at least two head-mounted devices, wherein the server is in communication connection with the at least two head-mounted devices; the server includes a memory and a processor, the memory of the server is configured to store a first computer program; the processor of the server is configured to execute the first computer program to implement the method according to the first aspect of the present disclosure;

the head-mounted device includes:

a first camera configured to acquire image data of the target individual;

a second camera configured to collect pose data of the head-mounted device;

a memory and a processor, wherein the memory of the head-mounted device is configured to store a second computer program; the processor of the head-mounted device is configured to execute the second computer program to transmit position data of the head-mounted device and pose data of an individual wearing other head-mounted devices to the server, so that the server determines relative pose data of the individual wearing the other head-mounted devices relative to the head-mounted device.

Alternatively, the first camera is a depth camera; and the second camera is a 6DoF positioning camera.

A beneficial effect of the embodiment of the present disclosure is that with the virtual reality interaction method provided by the present embodiment, by mapping the pose state of the target individual in the reality space to the virtual scene, then rendering the virtual individual in the virtual scene and making the virtual individual correspondingly display the pose state of the target individual, the user can observe the real-time state of other users participating in the interactive experience through the head-mounted device, perceive the user experience of others in the virtual scene, so that users can carry out virtual reality activities according to the observed real-time states of other users, which realizes the interaction of multiple users in the virtual reality scene, and improves the user experience and entertainment of virtual reality activities in the multi-person scene.

Other features and advantages of the embodiments of the present disclosure will become apparent from the following detailed description of exemplary embodiments of the present disclosure with reference to the accompanying drawings.

BRIEF DESCRIPTION OF THE DRAWINGS

The accompanying drawings which are incorporated in and constitute a part of the description illustrate embodiments of the present disclosure and together with the description thereof serve to explain the principles of the embodiments of the present disclosure.

DETAILED DESCRIPTION OF THE EMBODIMENTS

Various exemplary embodiments of the present disclosure will be described in detail with reference to the accompanying drawings. It should be noted that unless otherwise specified, the relative arrangement, numerical expressions and values of components and steps set forth in these embodiments do not limit the scope of the present invention.

The following description of at least one exemplary embodiment is in fact merely illustrative and is in no way intended to limit the present invention and its application or use.

Techniques, methods and devices known to those ordinarily skilled in the relevant art may not be discussed in detail, but where appropriate, the techniques, methods and devices should be regarded as part of the authorized description.

In all the examples shown and discussed herein, any specific value should be interpreted as exemplary only and not as a limitation. Thus, other examples of the exemplary embodiment can have different values.

It should be noted that similar reference numerals and letters denote similar items in the following figures, and therefore, once a certain item is defined in one figure, it is not necessary to further discuss it in the following figures.

The embodiment of the present disclosure relates to an application scene of virtual reality. In the application scene of virtual reality, a user can carry out a virtual reality interaction by wearing a virtual reality head-mounted integrated machine. Limited by the nature of virtual reality head-mounted integrated machines and their ability to provide VR (Virtual Reality) for only one person at a time, when two or more virtual reality head-mounted integrated users are in the real world for virtual reality experience at the same time, they may be immersed in different virtual reality environments without knowing each other's experience at all. Therefore, users often sacrifice social interaction for immersive entertainment, and vice versa.

In view of the above problems, the present application provides a virtual reality interaction method, a device and a system, in which images of other users are collected through the head-mounted integrated machine, and image recognition processing is performed according to the collected images of other users, to obtain key skeleton data of other users, then the virtual avatar with the same pose state is restored in the virtual environment through the key skeleton data, and the virtual avatar is driven in real time in combination with the 6DoF positioning data of the user's head-mounted integrated machine, so that each user can know the position and pose state of other users in real time through the head-mounted integrated machine worn by himself. The users of the virtual reality head-mounted integrated machine in the same physical environment can witness the same virtual reality scene content, and allow the interaction between the avatars of users in the same position in the virtual reality environment, so that each user can obtain the scene experience of the other party in real time.

Virtual Reality System

Figure 1:
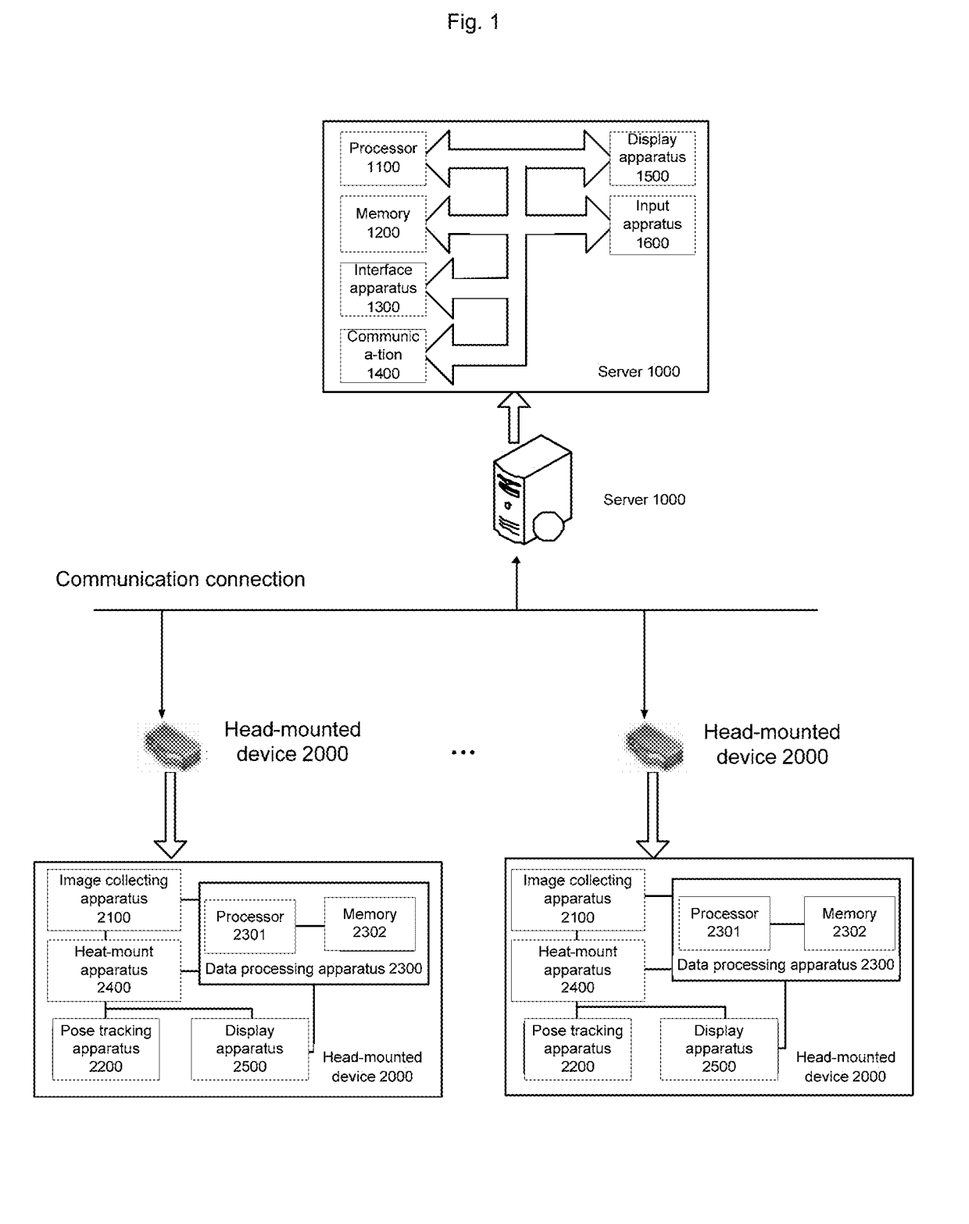
FIG. 1 is a schematic structural diagram of a virtual reality interaction system according to one embodiment.

FIG. 1 is a schematic structural diagram of a virtual reality interaction system according to one embodiment. As shown in FIG. 1, the virtual reality interaction system includes a server 1000 and at least two head-mounted devices 2000, and the server 1000 is in communication connection with the at least two head-mounted devices 2000.

The server 1000 is a business point that provides processing, database and communication facilities. The server 1000 may be a monolithic server 1000 or a distributed server 1000 that spans multiple computers or computer data centers. The server 1000 may be for example a database server 1000. In some embodiments, each server 1000 may include hardware, software or embedded logic components or combinations of two or more such components for executing suitable functions supported or implemented by the server 1000. For example, the server 1000 is such as a blade server 1000, a cloud server 1000, or the like, or may be a server group composed of a plurality of servers, and may include one or more of the above-mentioned types of servers 1000, or the like.

In one embodiment, the server 1000 may include a processor 1100, a memory 1200, an interface apparatus 1300, a communication apparatus 1400, a display apparatus 1500, and an input apparatus 1600, as shown in FIG. 1. In another embodiment, the server 1000 may also include a speaker, a microphone and the like, which are not limited herein.

The processor 1100 may be a dedicated server 1000 processor or a desktop computer processor or a mobile version processor that satisfies performance requirements and is not limited herein. The memory 1200 includes ROM (Read Only Memory), RAM (Random Access Memory), non-volatile memory such as a hard disk and the like, for example. The interface apparatus 1300 includes various bus interfaces such as a serial bus interface (including a USB interface), a parallel bus interface and the like, for example. The communication apparatus 1400 is capable of, for example, wired or wireless communication. The communication apparatus 1400 may include a short-range communication apparatus, such as an apparatus for short-range wireless communication based on a short-range wireless communication protocol such as Wi-Fi, Bluetooth, NFC (Near Field Communication), or the like. The communication apparatus 1400 may also include a remote communication apparatus, such as any apparatus for WLAN (Wireless Local Area Network), GPRS (General Packet Radio Service), and 2G/3G/4G/5G remote communication. The display apparatus 1500 is a liquid crystal display screen, a touch display screen and the like, for example. The input apparatus 1600 may include a touch screen, a keyboard or the like, for example.

The memory 1200 of the server 1000 is configured to store an executable first computer program, and the processor 1100 of the server 1000 is configured to execute the virtual reality interaction method executed by the server 1000 provided by the method embodiment of the present invention according to a control of the computer program.

Although a plurality of apparatuses in the server 1000 are shown in FIG. 1, the present invention may relate only to some of them, for example, the server 1000 relates only to the processor 1100, the memory 1200, and the communication apparatus 1400.

In this embodiment, the head-mounted device 2000 is for example a virtual reality head-mounted integrated machine. As shown in FIG. 1, the head-mounted device 2000 may include an image collecting apparatus 2100, a pose tracking apparatus 2200, a data processing apparatus 2300, a head-mounted apparatus 2400 and a display apparatus 2500.

The image collecting apparatus 2100 is configured to acquire an image of a reality space. For example, images of other individuals in the reality space from the main view of the head-mounted device can be acquired.

The image collecting apparatus 2100 is connected to the data processing apparatus 2300 through a wired or wireless connection. The wired connection is, for example, a USB connection, a bus connection or the like, etc. The wireless connection is, for example, WiFi connection, Bluetooth connection or the like.

The image collecting apparatus 2100 outputs the acquired image data of the reality space to the data processing apparatus 2300, and the data processing apparatus 2300 processes the image data to obtain the virtual pose data of the target individual in the virtual scene.

In some embodiments, the image collecting apparatus 2100 is a depth camera.

The pose tracking apparatus 2200 is configured to acquire posture data and position data of the head-mounted device. The pose tracking apparatus 2200 may be, for example, a 6DoF positioning camera.

The pose tracking apparatus 2200 is wired or wirelessly connected to the data processing apparatus 2300 to transmit pose tracking data of the head-mounted device including the pose data and the position data of the head-mounted device to the data processing apparatus 2300.

The display apparatus 2500 is, for example, a liquid crystal display screen or the like, and is configured to display a virtual scene to a user.

The pose tracking apparatus 2200, the image collecting apparatus 2100 and the display apparatus 2500 may be mounted on the head-mounted apparatus 2400. The position, posture, and the like of the head-mounted apparatus 2400 can be identified by the pose tracking apparatus 2200, thereby obtaining pose tracking data.

The data processing apparatus 2300 may include a processor 2301 and a memory 2302, the processor 2301 may be a mobile version processor 2301. The memory 2302 includes, for example, a ROM (Read Only Memory 2302), a RAM (Random Access Memory 2302), a non-volatile memory 2302 such as a hard disk and the like.

The memory 2302 of the head-mounted device is configured to store a second computer program; and the processor 2301 of the head-mounted device is configured to execute the second computer program to transmit position data of the head-mounted device and pose data of an individual wearing other head-mounted devices to the server 1000, so that the server 1000 determines relative pose data of the individual wearing the other head-mounted devices with respect to the head-mounted device.

In addition, the head-mounted device may also include an interface apparatus, a communication apparatus, a display apparatus, an input apparatus, a speaker, a microphone, and the like.

Although a plurality of apparatuses in the head-mounted device 2000 are shown in FIG. 1, the present invention may relate only to some of the apparatuses therein.

Hereinafter, various embodiments and examples according to the present invention will be described with reference to the accompanying drawings.

Method Embodiment I

Figure 2:
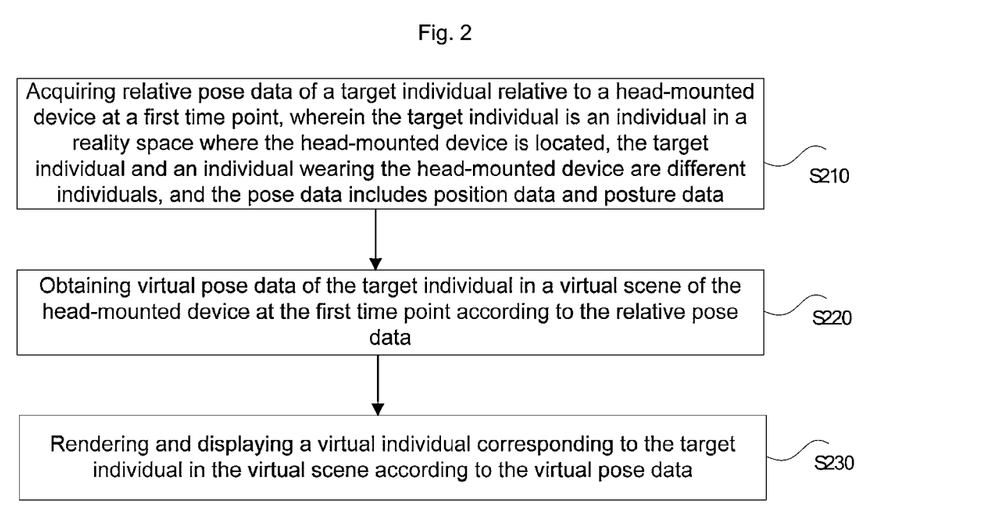
FIG. 2 is a flow diagram of a virtual reality interaction method according to one embodiment.

FIG. 2 is a flow diagram of a virtual reality interaction method according to one embodiment. The method can be applied to the situation that multiple users respectively use head-mounted devices to interact in a virtual scene, for example, multiple people respectively use their own head-mounted devices to play games in the same scene, and each can sense the real-time state of other game participants through its own head-mounted devices, thus realizing the interactive experience among game participants. The method can be executed by the head-mounted devices, and each head-mounted device processes the collected data to realize virtual scene rendering. Referring to FIG. 2, the method specifically includes the following steps:

S210, acquiring relative pose data of a target individual relative to a head-mounted device at a first time point, wherein the target individual is an individual in a reality space where the head-mounted device is located, the target individual and an individual wearing the head-mounted device are different individuals, and the pose data includes position data and posture data;

wherein the head-mounted device in the embodiment can be, for example, a virtual reality integrated machine head-mounted device, the head-mounted device is set with CPU, GPU, wireless network module and other components, and the head-mounted device can complete corresponding computational processing events, which can include pose data acquisition, image feature extraction, virtual scene rendering and the like of the head-mounted device itself.

In the embodiment, there is a position correspondence relationship between the entity scene of the head-mounted device and the virtual scene displayed by the head-mounted device, and the head-mounted device can render the virtual individual corresponding to the position in the virtual scene based on the position correspondence relationship.

The target individual is other individuals participating in the interactive experience of virtual reality, that is, the target individual does not include the individual wearing the head-mounted device. For example, there are three people participating in interactive experience activities. For the head-mounted device of individual A, the target individual may be individual B and/or individual C, specifically depending on the current viewing angle of the head-mounted device of the individual A, that is, the number of target individuals varies with the viewpoint of the head-mounted device in this embodiment.

Relative pose data refers to the pose data obtained by converting the pose data of the target individual in the reality space to the preset coordinate system. Please refer to the introduction of the following steps for the specific acquisition method of the relative pose data.

The first time point is any time point in the virtual reality experience process, and the time is the real time, which changes in real time with the virtual reality experience activity, and correspondingly, the acquired relative pose data is also updated in real time, so as to drive the corresponding virtual individuals in the virtual scene in real time.

In this embodiment, the virtual individual is drawn by the relative pose data, so that the virtual individual in the virtual scene presents a pose state matched with the target individual in the reality space, and the pose state of the target individual participating in interaction is displayed to the head-mounted device user in real time. Please refer to the introduction of the subsequent steps for the rendering method of the virtual individuals.

In one embodiment, the step S210 may include steps S211 to S213:

S211, acquiring target pose data of the target individual in a preset coordinate system at the first time point.

The target posture data includes target posture data and target position data. That is, the target posture data and the target position data of the target individual in the preset coordinate system, the target posture data and the target position data can be obtained by the image recognition result of the target individual, so that the resulted target posture data can truly characterize the pose state of the target individual in the reality space.

Since the target pose data includes the target pose data and the target position data, step S211 may be further optimized into a step of acquiring the target pose data of the target individual and a step of acquiring the target position data.

In one embodiment, the step of acquiring the target posture data may include S2111 to S2113:

S2111, acquiring image data of the target individual in the reality space collected by a first camera of the head-mounted device at the first time point.

The first camera may be a 3D camera, which can detect a depth of field distance of a shooting space. For example, the first camera may be a depth camera. According to characteristics of the first camera, it is obvious that the image data collected by the first camera carries posture information and position information of the target individual.

S2112, identifying first posture data of the target individual in a camera coordinate system according to the image data.

The first posture data includes position data and posture data of the target individual in the camera coordinate system.

As mentioned above, the image data collected by the first camera carries the posture information and position information of the target individual, so first posture data of the target individual in the camera coordinate system can be extracted by an image recognition algorithm.

In one embodiment, the step specifically includes:

identifying a set human skeleton point feature in the image data; and obtaining the first posture data according to the human skeleton point feature.

Specifically, the present embodiment can characterize the posture information of the human body by acquiring the skeleton point feature data of the set part of the human body. Usually, the preset human skeleton point feature data can include the skeleton feature data of 18 key points on the human body, that is, the posture feature of the target individual is characterized by the skeleton feature data of these 18 key points.

Alternatively, the feature of human skeleton points can be obtained by pre-configuring a human posture evaluation model to identify the image data. For example, the collected image data of the target individual is input to the preset human posture evaluation model, and the human posture evaluation model extracts the key features, and automatically output the human skeleton point feature data reflecting the human posture feature.

Alternatively, the human posture evaluation model in this embodiment is established by the following method:

constructing a convolutional neural network model; and performing model training on the convolutional neural network model by using sample images, to obtain the human posture evaluation model.

The constructing method and training method of the convolutional neural network model can refer to the related prior art. This is not limited in this embodiment.

In one embodiment, after obtaining the convolutional neural network model, through data collection of multi-person and multi-scene, a total of 4 million pieces of motion posture data of multiple people in multiple scenes were collected, and high-precision model training is conducted to obtain the body posture data of each person in the image information and obtain 18 key point data on each person, thereby constructing the human posture evaluation model that can detect the human posture motion data of other individuals.

S2113, obtaining the target posture data of the target individual in the preset coordinate system at the first time point according to the first posture data and set coordinate system conversion data; wherein the coordinate system conversion data reflects a conversion relationship between the camera coordinate system and the preset coordinate system.

The first posture data in the camera coordinate system is converted into the target posture data in the preset coordinate system through the conversion relation of the coordinate system, and the resulted target posture data is used for the head-mounted device to render the virtual individual with a matched posture in the virtual scene.

Illustratively, a second camera (e.g., a 6DoF positioning camera) for acquiring the position and pose data of the head-mounted device itself is disposed in the head-mounted device, and the coordinate system of the second camera is a preset coordinate system. The head-mounted device stores calibration parameters of the second camera and the first camera, with the calibration parameters, the pose data (i.e., the relative pose data) of the target individual in the preset coordinate system can be obtained by transforming the first pose data.

In the present embodiment, the posture feature of the target individual is extracted from the image data in the reality space through steps S2111 to S2113, and then the corresponding target posture data is obtained, so as to truly reflect the actual posture feature of the target individual through the target posture data.

In this step, by configuring a first camera in the head-mounted device, the first camera collects images of other individuals under the viewpoint of the head-mounted device, and then the features of the collected images are extracted through a pre-constructed human posture evaluation model to obtain the human posture motion data of the target individual, and to further obtain the relative pose data of the target individual relative to the head-mounted device through coordinate conversion.

In one embodiment, the step of acquiring target position data may include S2114 to S2116:

S2114, identifying first position data of the target individual in the camera coordinate system according to the image data; and S2115, obtaining the target position data of the target individual in the preset coordinate system at the first time point according to the first position data and the coordinate system conversion data.

As mentioned above, the image data collected by the first camera carries the posture information and position information of the target individual, therefore, the position data (i.e., the first position data) of the target individual in the camera coordinate system can be extracted by processing the collected image data through the image recognition algorithm, and then the target position data of the target individual in the preset coordinate system can be obtained by conducting a coordinate conversion on the first position data.

Continuing the above example, a second camera (such as a 6DoF positioning camera) is disposed in the head-mounted device, the position data of the head-mounted device can be obtained by the second camera, and the head-mounted device stores the calibration parameters of the second camera and the first camera, with the calibration parameters, the position data (i.e., the relative position data) of the target individual in the preset coordinate system can be obtained by transforming the first position data.

Alternatively, in another embodiment, the head-mounted device may also acquire position information of the target individual based on data interaction results with other head-mounted devices. Based on the concept, the step of acquiring the target position data may further include: acquiring second position data provided by the head-mounted device corresponding to the target individual as the target position data, wherein the second position data is position data of the head-mounted device in the set coordinate system at the first time point.

Each head-mounted device can collect its own pose data through the disposed pose tracking device (such as 6DoF positioning camera), and the pose data of each head-mounted device is used to determine the position of the virtual individual corresponding to the target individual in the virtual scene. For example, the head-mounted device A determines a position of the virtual individual of the head-mounted device B in the virtual scene by the pose data of the head-mounted device B.

The head-mounted devices are in communication connection to feed back their own pose data to each other. For example, if two head-mounted devices A and B participate in the interactive experience, the head-mounted device A needs to feed back the pose data of the head-mounted device A to the head-mounted device B in real time, and the head-mounted device B also needs to feed back the pose data of the head-mounted device B to the head-mounted device A.

In the present embodiment, by configuring a first camera in the head-mounted device, the first camera collects images of other individuals under the viewpoint of the head-mounted device, and the features of the collected images are extracted through a pre-constructed human posture evaluation model to obtain the pose data of the target individual, and to further obtain the target pose data of the target individual in the preset coordinate system through coordinate conversion.

S212, acquiring reference pose data of the head-mounted device in the preset coordinate system at the first time point.

When the user of the head-mounted device changes the position and/or pose, the head-mounted device correspondingly generates the position and/or pose changes, such as looking up, tilting to one side, etc. In the embodiment, the real-time pose state of the head-mounted device is represented by the reference pose data.

Alternatively, in the present embodiment, it is possible to collect the reference pose data of the head-mounted device in the preset coordinate system through the second camera of the head-mounted device.

In some embodiments, the second camera is specifically a 6DoF (6 degree of free) positioning camera, that is, the 6DoF positioning data acquired by the 6DoF positioning camera serves as the reference pose data of the head-mounted device.

Illustratively, in general, the 6DoF positioning camera consists of two or more Camera sensors and IMU 9-axis inertial navigation sensors, by combining Camera data and IMU9-axis inertial navigation sensor data by a computer vision algorithm, 6DoF data of head-mounted device is obtained, that is, the position and posture information of the user's head-mounted device relative to the real physical environment, that is, the user can walk freely in the corresponding VR virtual scene, and the walking distance corresponds to the real physical distance by 1:1.

S213, obtaining the relative pose data according to the target pose data and the reference pose data.

The head-mounted device obtains the relative pose data by data fusion of the target pose data and the reference pose data.

Since both the target pose data and the reference pose data are the pose data in the preset coordinate system, and the reference pose data is the real-time pose data characterizing the head-mounted device in the reference coordinate system, the real-time relative pose data can be obtained by superimposing the target pose data and the reference pose data.

S220, obtaining virtual pose data of the target individual in a virtual scene of the head-mounted device at the first time point according to the relative pose data.

Since there is a position correspondence relationship between the physical scene of the head-mounted device and the virtual scene displayed by the head-mounted device (the position correspondence relationship can be calibrated in advance through the prior art and will not be repeated here), after obtaining the relative pose data of the target individual in the preset coordinate system, the virtual pose data in the virtual scene can be obtained by converting the relative pose data based on the position correspondence relationship.

In this step, the virtual pose data is obtained by carrying out coordinate system conversion on the relative pose data, the relative pose data corresponds to the pose state of the target individual in the reality space, so the resulted virtual pose data also corresponds to the pose state of the target individual in the reality space, that is, the resulted virtual pose data in the virtual scene can truly characterize the pose state of the target individual in the reality space.

S230, rendering and displaying a virtual individual corresponding to the target individual in the virtual scene according to the virtual pose data.

The virtual pose data includes the virtual pose data and the virtual position data. According to the virtual pose data, by drawing virtual individuals with corresponding pose states for each target individual at corresponding positions in the virtual scene, the pose and position of the virtual individual are updated in real time through the updated virtual pose data, so that the corresponding virtual individual is driven to follow the change in the virtual scene in real time according to the pose information of the target individual in the reality space, and the real-time state of the target individual is displayed to the user. Alternatively, the corresponding virtual individuals can be rendered in the virtual scene based on the virtual pose data in a two-dimensional way.

It should be noted that the preset coordinate system of each head-mounted device in this embodiment is the same coordinate system, so that different individuals in the reality space are mapped to the same virtual scene.

With the virtual reality interaction method provided by the present embodiment, by mapping the pose state of the target individual in the reality space to the virtual scene, then rendering the virtual individual in the virtual scene and making the virtual individual correspondingly display the pose state of the target individual, the user can observe the real-time state of other users participating in the interactive experience through the head-mounted device, perceive the user experience of others in the virtual scene, so that users can carry out virtual reality activities according to the observed real-time states of other users, which realizes the interaction of multiple users in the virtual reality scene, and improves the user experience and entertainment of virtual reality activities in the multi-person scene.

In one embodiment, prior to step S210, the method may further include the following steps:

acquiring an interactive request output by the target individual, wherein the interactive request carries identity information of the target individual;

verifying the interaction request based on the identity information; and rendering a virtual individual corresponding to the target individual in the virtual scene when the verifying is passed.

Each individual participating in the experience needs to send an interactive request to apply for joining the interactive experience before starting. Individuals can send interactive requests through a social application APP.

Illustratively, a main control terminal can be pre-disposed in all head-mounted devices, before starting, each individual user sends a "request for joining multi-person social interaction" to the main control terminal through the social application APP disposed in the VR head-mounted device, and the main controller terminal confirms the user connection request. If the individual user is allowed to join, it sends a consent instruction, thus completing the user's joining connection confirmation.

Method Embodiment II

Figure 3:
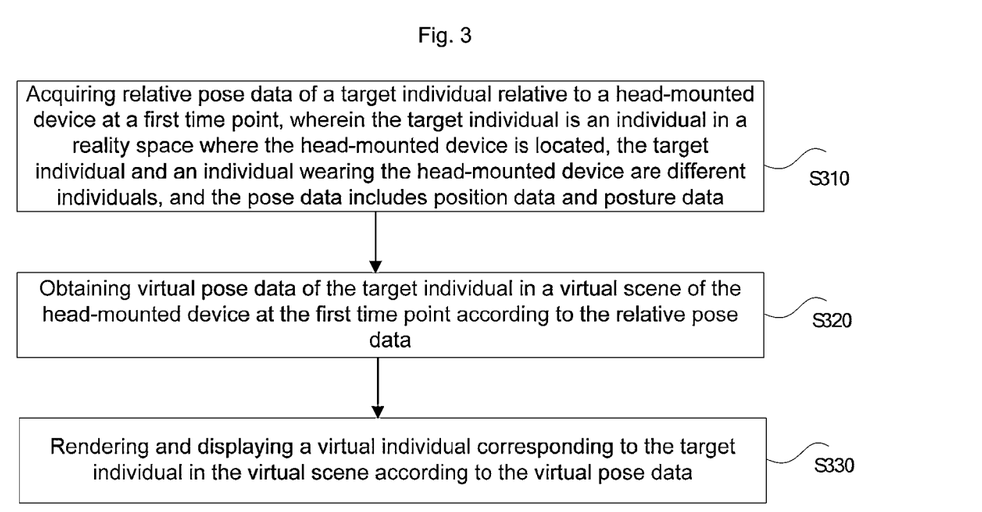
FIG. 3 is a flow diagram of the virtual reality interaction method according to another embodiment.

In another embodiment, the virtual reality interaction method of the present disclosure can also be executed by the server. Under this working condition, each head-mounted device is in communication connection with the server, and the server processes the data of different head-mounted devices separately to render the virtual scene under the main view of each head-mounted device, and then sends it to the corresponding head-mounted device for display. FIG. 3 is a flow diagram of the virtual reality interaction method according to another embodiment, referring to FIG. 3, the method includes:

S310, acquiring relative pose data of a target individual relative to a head-mounted device at a first time point, wherein the target individual is an individual in a reality space where the head-mounted device is located, the target individual and an individual wearing the head-mounted device are different individuals, and the pose data includes position data and posture data.

Each head-mounted device has a unique identity, and the server distinguishes the data of each head-mounted device according to the identity of each head-mounted device, so as to obtain the relative pose data of each head-mounted device from the viewpoint of each head-mounted device.

In one embodiment, step S310 includes S311 to S313:

S311, acquiring the target pose data of the target individual in a preset coordinate system at the first time point.

The target pose data is obtained by converting the pose data of the target individual in the reality space. The target pose data includes the target position data and the target posture data, which can be obtained by processing the position and posture data of the target individuals in the reality space.

Since the target pose data includes the target pose data and the target position data, step S311 can be further refined into a step of acquiring the target posture and a step of acquiring the target position.

In one embodiment, the step of acquiring the target posture data includes S3111 to S3113:

S3111, acquiring the first posture data of the target individual in the camera coordinate system.

The first posture data can be output by the head-mounted device. As described in the above embodiment, the head-mounted device can collect the image data of the target individual in the reality space through the first camera, and then process the image data through the built-in image recognition model to recognize the first posture data of the target individual in the camera coordinate system. The specific method for obtaining the first pose data by recognition of the head-mounted device can be referred to in the introduction of the above-mentioned embodiments and will not be repeated here. Certainly, the first pose data can also be obtained by directly processing the image data of the target individual in the reality space by the server. This is not limited in this embodiment.

S3112, obtaining the target posture data of the target individual in the preset coordinate system at the first time point according to the first posture data and set coordinate system conversion data, wherein the coordinate system conversion data reflects a conversion relationship between the camera coordinate system and the preset coordinate system.

The server stores coordinate system conversion data between the camera coordinate system and the preset coordinate system, and the server performs coordinate conversion on the first posture data according to the coordinate system conversion data to obtain the target posture data of the target individual in the preset coordinate system.

In one embodiment, the step of acquiring the target position data includes S3114 to S3116:

S3114, acquires the first position data of the target individual in the camera coordinate system.

Continuing the above example, the head-mounted device can collect the image data of the target individual in the reality space through the first camera, and then process the image data through the built-in image recognition model to recognize the first position data of the target individual in the camera coordinate system. Certainly, the first position data may be obtained by processing the image data of the target individual in the reality space by the server. This is not limited in this embodiment.

S3115, obtaining the target position data of the target individual in the preset coordinate system at the first time point according to the first position data and the coordinate system conversion data.

Similarly, the server performs coordinate conversion on the first position data according to the coordinate system conversion data to obtain the target position data of the target individual in the preset coordinate system.

In another embodiment, the server can also obtain the target position data by the following method: acquiring second position data provided by the head-mounted device corresponding to the target individual as the target position data, wherein the second position data is position data of the head-mounted device in the set coordinate system at the first time point.

Each head-mounted device feeds back its own pose data to the server, and the server can extract the position data (i.e., the second position data) of the head-mounted device correspondingly. The second position data is used to determine the virtual position of the target individual in the virtual scene. Given that the pose data collected by the second camera has higher reliability, it is possible in the embodiment to preferably use the second position provided by the head-mounted device as the target position data, so as to more realistically simulate the target individual in the reality space in the virtual scene.

Illustratively, the data fed back to the server by the head-mounted device of the individual A includes the target individual B, when the server processes the data of the head-mounted device of the individual A, the server obtains the second position data of the target individual B according to the pose data fed back by the head-mounted device of the individual B, and takes the second position data as the target position data of the target individual B in the preset coordinate system.

S312, acquiring reference pose data of the head-mounted device in the preset coordinate system at the first time point.

The reference pose data characterizes the position and posture information of the head-mounted device in the reality space, that is, it reflects the real-time pose state of the head-mounted device.

It should be noted that the preset coordinate system of each head-mounted device in this embodiment is the same coordinate system, so as to realize mapping different individuals in the reality space to the same virtual scene.

S313, obtaining the relative pose data according to the target pose data and the reference pose data.

S320, obtaining virtual pose data of the target individual in a virtual scene of the head-mounted device at the first time point according to the relative pose data.

The server stores the position correspondence relationship between the physical scene of the head-mounted device and the virtual scene displayed by the head-mounted device, and the server converts the relative pose data based on the position correspondence relationship to obtain the virtual pose data of the head-mounted device in the virtual scene.

S330, rendering and displaying a virtual individual corresponding to the target individual in the virtual scene according to the virtual pose data.

The server renders the information content of the multi-person interactive scene through the GPU, and the virtual scene contains a virtual individual corresponding to the target individual, and the server further sends the rendered virtual scene to the head-mounted device.

With the update changes at the first time, the server updates the relative pose data of each head-mounted device in real time, renders and updates the information content of multi-person interactive scene through GPU, and then sends it to the corresponding head-mounted device in real time, so that users can know the real-time state of the target individual in real time through the head-mounted device.

In the embodiment, the size and specification of the hardware configuration such as the processing capability, the rendering capability of the application scene and the like of the server can be specifically determined according to the number of user terminals in the actual application and the rendering complexity of the virtual reality content.

In one embodiment, prior to step S310, the method further includes:

acquiring an interactive request output by the target individual, wherein the interactive request carries identity information of the target individual;

verifying the interaction request based on the identity information; and rendering a virtual individual corresponding to the target individual in the virtual scene when the verifying is passed.

Illustratively, before each user starts, in the social application APP of the head-mounted device, by sending an interactive request similar to "joining multi-person social interaction request" to the server, the server quickly sends the interactive request to a main controller terminal, and the main controller terminal confirms the connection request of the user, and if the user is allowed to join, it sends a consent instruction, thus completing the connection confirmation of the user.

In the virtual reality interaction method provided by the embodiment, the head-mounted device collects image data of the target individual under the main view through the first camera, and extracts the features of the image data to obtain the first pose data, sends the first pose data to the server, the server performs coordinate conversion on the first pose data to obtain relative pose data of the target individual in the preset coordinate system, the server further obtains virtual pose data based on the relative pose data, then renders a virtual individual with adaptive pose state in the virtual scene based on the virtual pose data, so that the individual wearing the head-mounted device can observe the real-time pose state of the target individual through the head-mounted device, which realizes the multi-person interaction in the virtual scene, improves the user experience and increases the entertainment of the user.

Device Embodiment

Figure 4:
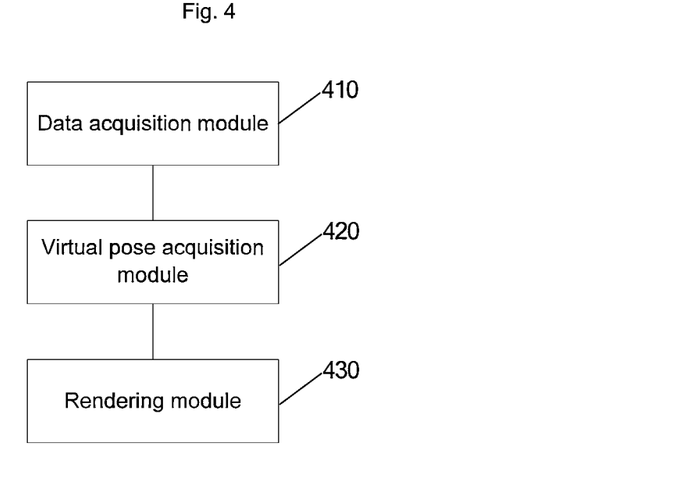
FIG. 4 is a principle block diagram of an apparatus according to one embodiment.

FIG. 4 is a principle block diagram of an apparatus according to one embodiment. As shown in FIG. 4, the virtual reality interaction device may include a data acquisition module 410, a virtual pose acquisition module 420, and a rendering module 430, wherein the data acquisition module 410 is configured to acquire relative pose data of a target individual relative to a head-mounted device in a reality space where the head-mounted device is located, wherein the target individual and an individual wearing the head-mounted device are different individuals;

the virtual pose acquisition module 420 is configured to acquire virtual pose data of the target individual in a virtual scene of the head-mounted device according to the relative pose data and pose data of the head-mounted device in a reality space; and the rendering module 430 is configured to render and display a virtual individual corresponding to the target individual in the virtual scene according to the virtual pose data.

In one embodiment, the data acquisition module 410 may also be configured to:

acquire the target pose data of the target individual in a preset coordinate system at the first time point;

acquire reference pose data of the head-mounted device in the preset coordinate system at the first time point; and obtain the relative pose data according to the target pose data and the reference pose data.

In one embodiment, the data acquisition module 410 may also be configured to:

acquire image data of the target individual in the reality space collected by a first camera of the head-mounted device at the first time point;

identify first posture data of the target individual in a camera coordinate system according to the image data; and obtain the target posture data of the target individual in the preset coordinate system at the first time point according to the first posture data and set coordinate system conversion data; wherein the coordinate system conversion data reflects a conversion relationship between the camera coordinate system and the preset coordinate system.

In one embodiment, the data acquisition module 410 may also be configured to:

identify first position data of the target individual in the camera coordinate system according to the image data; and obtain the target position data of the target individual in the preset coordinate system at the first time point according to the first position data and the coordinate system conversion data; or, acquire second position data provided by the head-mounted device corresponding to the target individual as the target position data, wherein the second position data is position data of the head-mounted device in the set coordinate system at the first time point.

In one embodiment, the data acquisition module 410 may also be configured to:

identify a set human skeleton point feature in the image data; and obtain the first posture data according to the human skeleton point feature.

In one embodiment, the virtual reality device further includes a pose data acquisition module 410 configured to acquire the pose data of the head-mounted device in the reality space through a second camera of the head-mounted device.

In one embodiment, the virtual reality device further includes:

an interaction request acquisition module configured to acquire an interactive request output by the target individual, wherein the interactive request carries identity information of the target individual;

a verification module configured to verify the interactive request based on the identity information.

Accordingly, the rendering module 430 is further configured to render a virtual individual corresponding to the target individual in the virtual scene when the verifying is passed.

The present invention may be a system, method, and/or computer program product. The computer program product may include a computer-readable storage medium loaded with a computer-readable program instruction thereon for enabling a processor to implement aspects of the present invention.

The computer-readable storage medium may be a tangible device that may hold and store instructions used by an instruction executing device. The computer-readable storage medium may be, for example, but is not limited to, an electrical storage device, a magnetic storage device, an optical storage device, an electromagnetic storage device, a semiconductor storage device, or any suitable combination of the above. More specific examples (non-exhaustive list) of computer-readable storage media include: portable computer disk, hard disk, Random Access Memory (RAM), Read-Only Memory (ROM), Erasable Programmable Read-Only Memory (EPROM or flash memory), Static Random Access Memory (SRAM), Portable Compact Disk Read-Only Memory (CD-ROM), Digital Versatile Disk (DVD), memory stick, floppy disk, mechanical encoding device, such as punched cards or grooved bumps on which instructions are stored, and any suitable combination of the above. The computer-readable storage media used herein are not interpreted as transient signals themselves, such as radio waves or other freely propagating electromagnetic waves, electromagnetic waves propagating through waveguides or other transmission media (e.g., optical pulses through fiber optic cables), or electrical signals transmitted through wires.

The computer-readable program instructions described herein may be downloaded from a computer-readable storage medium to individual computing/processing devices, or to an external computer or external storage device over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operations of the present invention may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk, C++, etc. and conventional procedural programming languages such as the "C" language or similar programming languages. Computer-readable program instructions may be executed entirely on the user's computer, partly on the user's computer, as an independent software package, partly on the user's computer and partly on a remote computer, or entirely on a remote computer or server. In the case of the remote computer, the remote computer may be connected to the user computer over any kind of network, including a local area network (LAN) or a wide area network (WAN), or may be connected to an external computer (e.g., via the Internet using an Internet service provider). In some embodiments, various aspects of the present invention are implemented by personalizing an electronic circuit, such as a programmable logic circuit, a field programmable gate array (FPGA), or a programmable logic array (PLA), using state information of the computer-readable program instructions executable by the electronic circuit.

Various aspects of the present invention are described herein with reference to flowcharts and/or block diagrams of the methods, apparatus (systems) and computer program products according to embodiments of the invention. It should be understood that each block of the flowchart and/or block diagrams and combinations of the blocks in the flowchart and/or block diagrams may be implemented by the computer-readable program instructions.

These computer-readable program instructions may be provided to a processor of a general purpose computer, a special purpose computer, or other programmable data processing device, thereby producing a machine such that the instructions, when executed by a processor of a computer or other programmable data processing device, produce apparatuses for carrying out the functions/actions specified in one or more blocks in the flowchart and/or block diagram. These computer-readable program instructions may also be stored in a computer-readable storage medium, the instructions cause computers, programmable data processing apparatus, and/or other devices to operate in a specific manner, such that the computer-readable medium in which the instructions are stored includes an article of manufacture including instructions for implementing various aspects of the functions/actions specified in one or more blocks in the flowchart and/or block diagram.

The computer-readable program instructions may also be loaded onto computers, other programmable data processing apparatuses, or other devices, such that a series of operating steps are executed on a computer, other programmable data processing apparatus, or other devices to produce a computer-implemented process such that instructions executed on the computer, other programmable data processing apparatus, or other devices implement the functions/actions specified in one or more blocks in the flowchart and/or block diagram.

The flowcharts and block diagrams in the accompanying drawings illustrate possible implementations of architectures, functions and operations of systems, methods and computer program products according to various embodiments of the present invention. In this regard, each block in a flowchart or block diagram may represent a module, program segment, or part of an instruction containing one or more executable instructions for implementing a specified logical function. In some alternative implementations, the functions indicated in the boxes may also occur in a different order than those indicated in the drawings. For example, two successive boxes can actually be executed substantially in parallel, or they can sometimes be executed in a reverse order, depending on the functionality involved. It is also noted that each block in the block diagram and/or flowchart, and combinations of the blocks in the block diagram and/or flowchart, may be implemented in a dedicated hardware-based system that executes a specified function or action, or may be implemented in a combination of dedicated hardware and computer instructions. It is well known to those skilled in the art that the implementation by hardware, the implementation by software and the implementation by a combination of software and hardware are all equivalent.

Embodiments of the present invention have been described above, and the above description is exemplary not exhaustive and is not limited to the disclosed embodiments. Many modifications and changes will be apparent to those of ordinary skill in the art without departing from the scope and spirit of the illustrated embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is limited by the appended claims.

The invention claimed is:

1. A virtual reality interaction method, comprising:
acquiring relative pose data of a target individual relative to a head-mounted device at a first time point, wherein the target individual is an individual in a reality space where the head-mounted device is located, the target individual and an individual wearing the head-mounted device are different individuals;
obtaining virtual pose data of the target individual in a virtual scene of the head-mounted device at the first time point according to the relative pose data; and
rendering and displaying a virtual individual corresponding to the target individual in the virtual scene according to the virtual pose data,
wherein acquiring the relative pose data of the target individual relative to the head-mounted device at the first time point comprises:
acquiring target pose data of the target individual in a preset coordinate system at the first time point
acquiring reference pose data of the head-mounted device in the preset coordinate system at the first time point and
obtaining the relative pose data according to the target pose data and the reference pose data, and
wherein the target pose data comprises target posture data and target position data, and acquiring the target posture data of the target individual in the preset coordinate system at the first time point comprises:
acquiring image data, which is collected by a first camera of the head-mounted device at the first time point, of the target individual in the reality space;
identifying first posture data of the target individual in a camera coordinate system according to the image data; and
obtaining the target posture data of the target individual in the preset coordinate system at the first time point according to the first posture data and set coordinate system conversion data; wherein the coordinate system conversion data reflects a conversion relationship between the camera coordinate system and the preset coordinate system.

2. The virtual reality interaction method according to claim 1, wherein acquiring the target position data of the target individual in the preset coordinate system at the first time point comprises:
identifying first position data of the target individual in the camera coordinate system according to the image data; and obtaining the target position data of the target individual in the preset coordinate system at the first time point according to the first position data and the coordinate system conversion data; or
acquiring the target position data, which is second position data provided by the head-mounted device corresponding to the target individual, wherein the second position data is position data of the head-mounted device in the set coordinate system at the first time point.

3. The virtual reality interaction method according to claim 1, wherein identifying the first posture data of the target individual in the camera coordinate system according to the image data comprises:
identifying set human skeleton point feature in the image data; and
obtaining the first posture data according to the human skeleton point feature.

4. The virtual reality interaction method according to claim 1, wherein prior to obtaining the virtual pose data of the target individual in the virtual scene of the head-mounted device, the method further comprises:
acquiring pose data of the head-mounted device in the reality space by a second camera of the head-mounted device.

5. The virtual reality interaction method according to claim 1, wherein the method further comprises:
acquiring an interactive request output by the target individual, wherein the interactive request carries identity information of the target individual;
verifying the interaction request based on the identity information; and
rendering the virtual individual corresponding to the target individual in the virtual scene when the verifying is passed.

6. A virtual reality interaction apparatus comprising a memory and processor, wherein
the memory is configured to store a computer program; and
the processor is configured to execute the computer program to
acquire relative pose data of a target individual relative to a head-mounted device in a reality space where the head-mounted device is located, wherein the target individual and an individual wearing the head-mounted device are different individuals;
acquire virtual pose data of the target individual in a virtual scene of the head-mounted device according to the relative pose data and pose data of the head-mounted device in the reality space; and
render and display a virtual individual corresponding to the target individual in the virtual scene according to the virtual pose data,
wherein the processor is configured to
acquire target pose data of the target individual in a preset coordinate system at the first time point
acquire reference pose data of the head-mounted device in the preset coordinate system at the first time point and
obtain the relative pose data according to the target pose data and the reference pose data, and wherein the processor is further configured to
acquire image data, which is collected by a first camera of the head-mounted device at the first time point, of the target individual in the reality space;
identify first posture data of the target individual in a camera coordinate system according to the image data; and
obtain the target posture data of the target individual in the preset coordinate system at the first time point according to the first posture data and set coordinate system conversion data,
wherein the coordinate system conversion data reflects a conversion relationship between the camera coordinate system and the preset coordinate system.

7. The virtual reality interaction apparatus according to claim 6, wherein the processor is further configured to identify first position data of the target individual in the camera coordinate system according to the image data; and obtain the target position data of the target individual in the preset coordinate system at the first time point according to the first position data and the coordinate system conversion data; or acquire the target position data, which is second position data provided by the head-mounted device corresponding to the target individual, wherein the second position data is position data of the head-mounted device in the set coordinate system at the first time point.

8. The virtual reality interaction apparatus according to claim 6, wherein the processor is further configured to identify set human skeleton point feature in the image data; and obtain the first posture data according to the human skeleton point feature.

9. The virtual reality interaction apparatus according to claim 6, wherein the processor is further configured to acquire pose data of the head-mounted device in the reality space by a second camera of the head-mounted device.

10. The virtual reality interaction apparatus according to claim 6, wherein the processor is further configured to acquire an interactive request output by the target individual, wherein the interactive request carries identity information of the target individual; verify the interaction request based on the identity information; and render the virtual individual corresponding to the target individual in the virtual scene when the verifying is passed.

11. A virtual reality interaction system, wherein the system comprises a server and at least two head-mounted devices, the server is in communication connection with the at least two head-mounted devices;
the server comprises a memory and a processor, the memory of the server is configured to store a first computer program;
the processor of the server is configured to
execute the first computer program to acquire relative pose data of a target individual relative to a head-mounted device in a reality space where the head-mounted device is located, wherein the target individual and an individual wearing the head-mounted device are different individuals;
acquire virtual pose data of the target individual in a virtual scene of the head-mounted device according to the relative pose data and pose data of the head-mounted device in the reality space; and
render and display a virtual individual corresponding to the target individual in the virtual scene according to the virtual pose data;
the head-mounted devices each comprises:
a first camera configured to acquire image data of the target individual;

a second camera configured to collect pose data of the head-mounted device;

a memory and a processor, wherein the memory of the head-mounted device is configured to store a second computer program; the processor of the head-mounted device is configured to execute the second computer program to transmit position data of the head-mounted device and pose data of an individual wearing other head-mounted device to the server, so that the server determines relative pose data of the individual wearing other head-mounted device relative to the head-mounted device, wherein the processor of the server is further configured to acquire target pose data of the target individual in a preset coordinate system at the first time point acquire reference pose data of the head-mounted device in the preset coordinate system at the first time point and obtain the relative pose data according to the target pose data and the reference pose data, and wherein the processor of the server is further configured to acquire image data, which is collected by a first camera of the head-mounted device at the first time point, of the target individual in the reality space; identify first posture data of the target individual in a camera coordinate system according to the image data; and obtain the target posture data of the target individual in the preset coordinate system at the first time point according to the first posture data and set coordinate system conversion data, wherein the coordinate system conversion data reflects a conversion relationship between the camera coordinate system and the preset coordinate system.

12. The virtual reality interaction system according to claim 11, wherein the first camera is a depth camera; and the second camera is a 6 degree of free (6DoF) positioning camera.

13. The virtual reality interaction system according to claim 11, wherein the processor of the server is further configured to identify first position data of the target individual in the camera coordinate system according to the image data; and obtain the target position data of the target individual in the preset coordinate system at the first time point according to the first position data and the coordinate system conversion data; or acquire the target position data, which is second position data provided by the head-mounted device corresponding to the target individual, wherein the second position data is position data of the head-mounted device in the set coordinate system at the first time point.

14. The virtual reality interaction system according to claim 11, wherein the processor of the server is further configured to identify set human skeleton point feature in the image data; and obtain the first posture data according to the human skeleton point feature.

\* \* \* \* \*